US008243343B2

(12) United States Patent
Takashima

(10) Patent No.: US 8,243,343 B2
(45) Date of Patent: Aug. 14, 2012

(54) RECORDING MATERIAL DETECTING APPARATUS

(75) Inventor: Kazunori Takashima, Sunto-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 1231 days.

(21) Appl. No.: 11/744,146

(22) Filed: May 3, 2007

(65) Prior Publication Data

US 2007/0286664 A1 Dec. 13, 2007

(30) Foreign Application Priority Data

Jun. 7, 2006 (JP) ................................ 2006-158639

(51) Int. Cl.
*H04N 1/40* (2006.01)
*H04N 1/04* (2006.01)

(52) U.S. Cl. ......... 358/461; 358/496; 358/498; 382/274

(58) Field of Classification Search ....................... None
See application file for complete search history.

(56) References Cited

U.S. PATENT DOCUMENTS

| | | | | |
|---|---|---|---|---|
| 2005/0031384 | A1 * | 2/2005 | Sohmiya et al. | 399/309 |
| 2005/0162697 | A1 * | 7/2005 | Kiwada | 358/1.18 |
| 2005/0242493 | A1 * | 11/2005 | Agata | 271/226 |

FOREIGN PATENT DOCUMENTS

| | | | | |
|---|---|---|---|---|
| JP | 04-208935 | A | | 7/1992 |
| JP | 2003-315934 | A | | 11/2003 |
| JP | 2004-61864 | A | | 2/2004 |
| JP | 2004-061864 | A | | 2/2004 |
| JP | 2004061864 | A | * | 2/2004 |
| JP | 2006-201560 | A | | 8/2006 |

* cited by examiner

*Primary Examiner* — Dov Popovici
*Assistant Examiner* — Hou Long Chen
(74) *Attorney, Agent, or Firm* — Canon USA Inc IP Division

(57) ABSTRACT

A recording material detecting apparatus includes a detecting device and a reference member. The detecting device irradiates a recording material with light and detects the light from the recording material. The reference member has a reference portion detectable by the detecting device in order to correct the output from the detecting device. The reference member is capable of moving from a position where the reference portion is detected by the detecting device. The reference member is moved by the recording material. Since a driving unit such as a motor is not necessary, the cost of the apparatus body can be dramatically reduced, and the apparatus structure can be dramatically simplified.

6 Claims, 8 Drawing Sheets

RECORDING MATERIAL DETECTING APPARATUS

BACKGROUND OF THE INVENTION

1. Field of the Invention

The present invention relates to a recording material detecting apparatus applied to an image forming apparatus such as a printer or a photocopier, and more specifically, it relates to a reference member for correcting the output from a detecting device.

2. Description of the Related Art

There are many types of sheet materials used as recording materials for image forming apparatuses, for example, so-called plain copying paper (plain paper), transparent film for projectors, white film for obtaining a high-quality image, and so forth. In addition, there are various thicknesses of sheets of plain paper, for example, 60 $g/m^2$ and 200 $g/m^2$ in basis weight.

In order to form an excellent image on any type of sheet material, the image forming condition needs to be changed according to the type of sheet material to be used. For example, in an electrophotographic image forming apparatus, during transferring, an optimum bias needs to be applied according to the resistance value of the sheet material. More specifically, a low bias needs to be applied to plain paper, which has a low resistance value, and a high bias needs to be applied to gloss film, which has a high resistance. In addition, fusing needs to be performed at an optimum temperature according to the heat capacity of the sheet material. More specifically, fusing needs to be performed at a low temperature in the case of plain paper, which has a low heat capacity, and fusing needs to be performed at a high temperature in the case of gloss film, which has a high heat capacity. In order to obtain an excellent image regardless of the type of sheet material, the type of sheet material needs to be detected. In general, an optical sensor is used for such detection.

An optical sensor reads the surface of a sheet material conveyed to the sensor. The accuracy of reading differs from sensor to sensor, and varies due to the accuracy of mounting location, long-term deterioration, and so forth. In order to correct these variations, the sensor reads a reference portion. On the basis of the result, the output from the sensor is corrected. This reading is preferably performed under the same condition as the reading of the sheet material conveyed to the sensor, that is to say, in substantially the same plane as the sheet material (conveying plane). Therefore, the reference portion is preferably placed in substantially the same plane as the sheet material.

However, in this case, the sheet material being conveyed can contaminate and damage the surface of the reference portion.

In order to solve the problem of contamination and damage of a reference portion in an optical sensor, Japanese Patent Laid-Open No. 4-208935 discloses an apparatus in which a reference portion is supported by a movable supporting member and is retracted to a position apart from the conveying surface by a driving unit. That is to say, a supporting member is driven by a driving unit so that a reference portion is retracted to a position apart from the conveying surface, and thereafter a sheet material is conveyed to the conveying surface.

However, in the case of the above-described known apparatus, since a driving unit is used for moving a reference portion, a motor or the like is necessary. Therefore, the cost is increased and the apparatus structure is more complicated.

SUMMARY OF THE INVENTION

The present invention is directed to a recording material detecting apparatus in which the output from a detecting device is corrected with high accuracy, without complicating the apparatus structure.

According to an aspect of the present invention, a recording material detecting apparatus includes a detecting device and a reference member. The detecting device irradiates a recording material with light and detects the light from the recording material. The reference member has a reference portion detectable by the detecting device in order to correct the output from the detecting device. The reference member is capable of moving from a position where the reference portion is detected by the detecting device. The reference member is moved by the recording material.

Further features of the present invention will become apparent from the following description of exemplary embodiments (with reference to the attached drawings).

DESCRIPTION OF THE EMBODIMENTS

First Embodiment

A first embodiment of a recording material detecting apparatus according to the present invention will now be described with reference to FIGS. 1 to 7.

Figure 1:
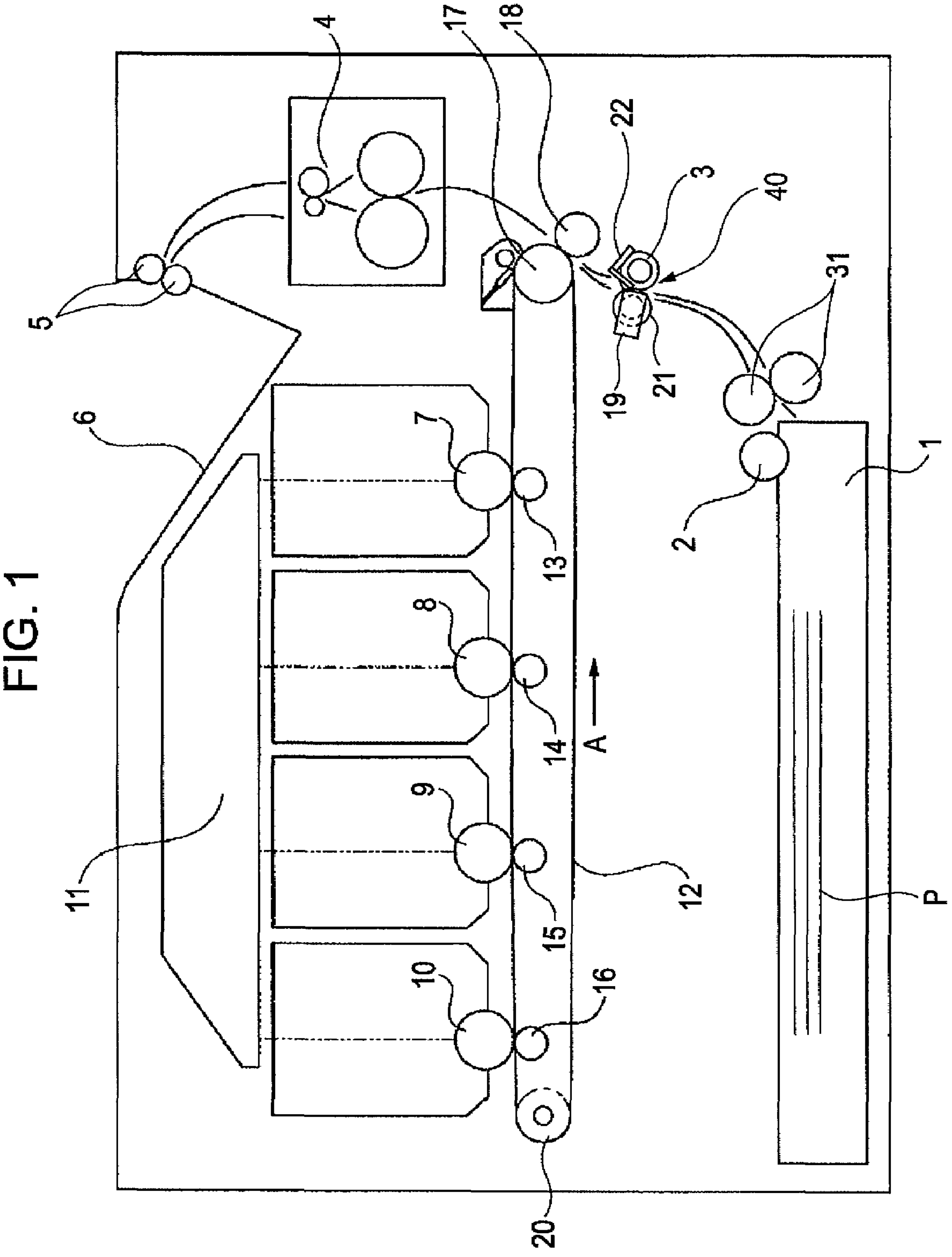
FIG. 1 illustrates an image forming apparatus according to a first embodiment of the present invention.

FIG. 1 is a schematic view of an image forming apparatus equipped with a recording material detecting apparatus 40. In FIG. 1, reference numeral 1 denotes a paper cassette, which contains sheet materials P serving as recording materials; reference numeral 2 denotes a paper feed roller; reference numeral 31 denotes a conveying roller pair, which is a pair of conveying members conveying a sheet material P; reference numeral 3 denotes a registration roller, which is a conveying member conveying a sheet material P; reference numeral 21 denotes opposing rollers, which are opposing members of the registration roller 3; and reference numeral 19 denotes an optical sensor, which is a detecting device detecting the surface condition of a sheet material P. The sensor 19 is provided at a position corresponding to nips where the registration roller 3 and the opposing rollers 21 are in contact with each other. The sensor 19 has a light emitter and a light detector. The sensor 19 irradiates a sheet material P with light, and receives light obtained from the sheet material P, thereby detecting the surface properties of the sheet material P. If another light emitter is provided opposite the sensor 19, light penetrating a sheet material P is detected by the light detector of the sensor 19, and thereby the sensor 19 can detect the thickness of the sheet material P.

Figure 2:
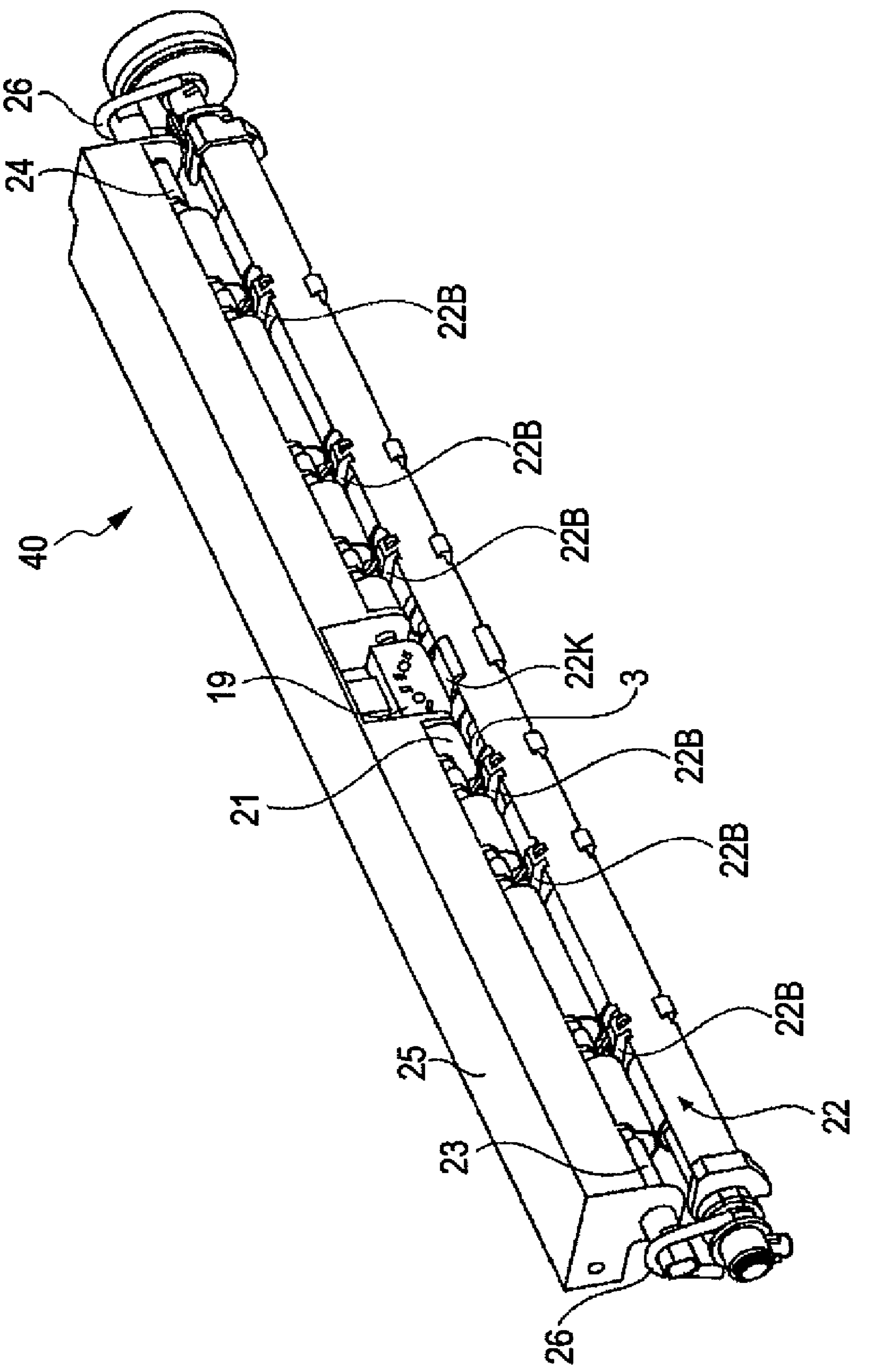
FIG. 2 is a perspective view of a recording material detecting apparatus.
Figure 3:
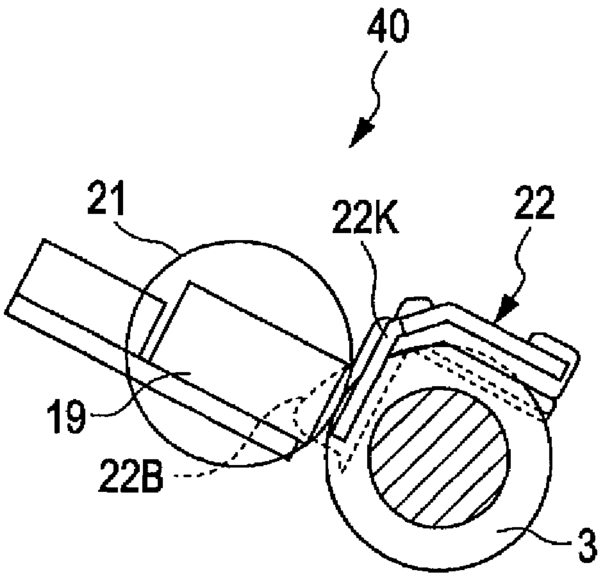
FIG. 3 illustrates an optical sensor detecting the surface condition of a sheet material.

FIG. 2 is a perspective view of the recording material detecting apparatus 40, that is to say, the registration roller 3 and its vicinity. In FIG. 2, reference numeral 22 denotes a registration shutter, which is a skew correcting member correcting the skew of a sheet material P and is supported rockably and coaxially with the registration roller 3. This registration shutter 22 is provided with six abutments 22B. The abutments 22B protrude farther than the nips between the registration roller 3 and the opposing rollers 21 toward the opposing rollers 21 side. The abutments 22B are aligned along the width direction of the paper (the direction perpendicular to the direction in which the sheet material P moves). That is to say, the leading edge of a sheet material P is pressed against the abutments 22B, and thereby the skew of the sheet material P is corrected.

In the center of this registration shutter 22 is provided a flat plate 22K, which is a reference portion. This flat plate 22K is disposed opposite the sensor 19. In this embodiment, the reference portion is a white flat plate.

The flat plate 22K is used for correcting the output of the sensor 19. The flat plate 22K is detected by the sensor 19 in advance in order to obtain a reference output. As described above, this flat plate 22K is provided in the registration shutter 22. The registration shutter 22 is a supporting member supporting the flat plate 22K. In other words, the registration shutter 22 is a reference member having the reference portion (flat plate 22K). That is to say, the registration shutter 22 is provided with the reference portion 22K, and the registration shutter 22 is a skew correcting member correcting the skew of a sheet material P, and is also a reference member for correcting the output of the sensor 19. Since this reference member is a registration shutter 22, this reference member can move from a position where the reference portion 22K is detected by the sensor 19.

In FIG. 1, reference numeral 4 denotes a fusing unit, reference numeral 5 denotes a paper output roller pair, reference numeral 6 denotes a paper output tray, reference numerals 7 to 10 denote photosensitive drums, which are image bearing members, and reference numeral 11 denotes a laser scanner, which is an exposing unit. The laser scanner 11 exposes the photosensitive drums 7 to 10 so as to form latent images thereon. The latent images formed on the photosensitive drums 7 to 10 are developed with yellow, magenta, cyan, and black toners, respectively, by developing units (not shown). Reference numeral 12 denotes an intermediate transfer belt, which is an intermediate transfer member. Reference numerals 13 to 16 denote first transfer rollers, which are first transfer units. The first transfer rollers 13 to 16 are in contact with the photosensitive drums 7 to 10 with the intermediate transfer belt 12 in between. The intermediate transfer belt 12 rotates in the direction of arrow A in FIG. 1. The intermediate transfer belt 12 is stretched around a driving roller 17 and a tension roller 20. The tension roller 20 applies a tension to the intermediate transfer belt 12. A second transfer roller 18 is a second transfer unit. The driving roller 17 is also an opposing roller disposed opposite the second transfer roller 18.

Next, how the sensor 19 is fixed will be described with reference to FIG. 2. The sensor 19 is disposed between the left and right sets of opposing rollers 21 so as to separate left and right opposing roller shafts 23 and 24. The sensor 19 is fixed to a roller holder 25 holding the left and right opposing roller shafts 23 and 24, and is pressed integrally with the opposing rollers 21 by pressing springs 26 toward the registration roller 3 side.

The above-described sensor 19, registration roller 3, opposing rollers 21, registration shutter 22 having the reference portion 22K, and so forth constitute the recording material detecting apparatus 40.

Figure 4:
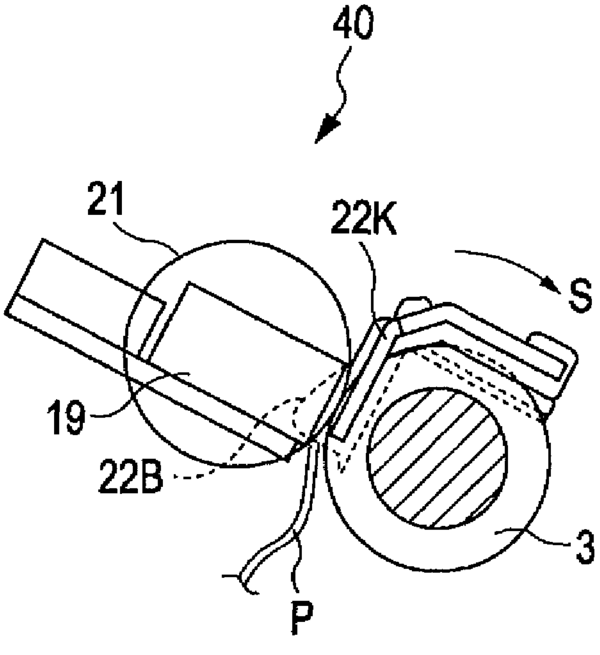
FIGS. 4 to 7 illustrate how a reference portion operates as the sheet material moves.
Figure 5:
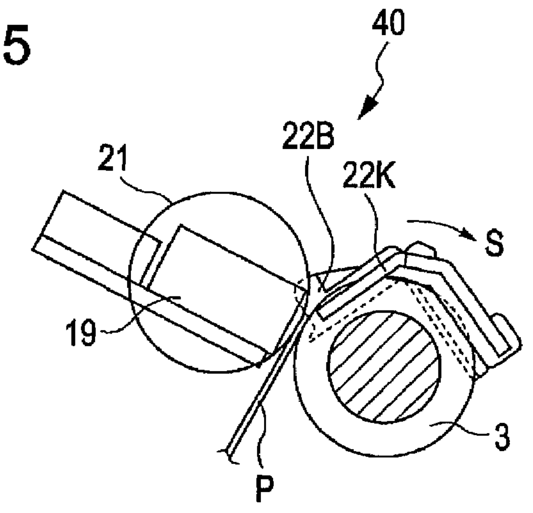

Next, the operation of the recording material detecting apparatus 40 will be described. Before a sheet material P is conveyed to the nips between the registration roller 3 and the opposing rollers 21, the registration shutter 22 is located at a position shown in FIG. 3. The flat plate 22K provided in the registration shutter 22 is located at a reading position (detection position) in the conveying path and faces the sensor 19. That is to say, when detected by the sensor (detecting device) 19, the flat plate (reference portion) 22K is located in the sheet material conveying path. At this time, the sensor 19 reads the flat plate 22K. The difference from the initially read value is calculated. On the basis of the difference, the output of the sensor 19 is corrected. After this, the leading edge of a sheet material P supplied by the paper feed roller 2 from the paper cassette 1 is pressed against the abutments 22B of the registration shutter 22, and thereby the skew of the sheet material P is corrected (FIG. 4). After that, as shown in FIG. 5, the resilience of the sheet material P rotates the registration shutter 22 in the direction of arrow S, and the sheet material P reaches the nips between the registration roller 3 and the opposing rollers 21. After this, the sheet material P in the nips pushes the registration shutter 22 and is conveyed a fixed distance, and then stops in the state shown in FIG. 6. The sheet material P in the nips is nipped by the registration roller 3 and the opposing rollers 21. These nips are separated in the axial direction of the registration roller 3, and the sheet material P between the nips is tightly stretched. Therefore, the sheet material P can easily push the registration shutter 22.

Figure 6:
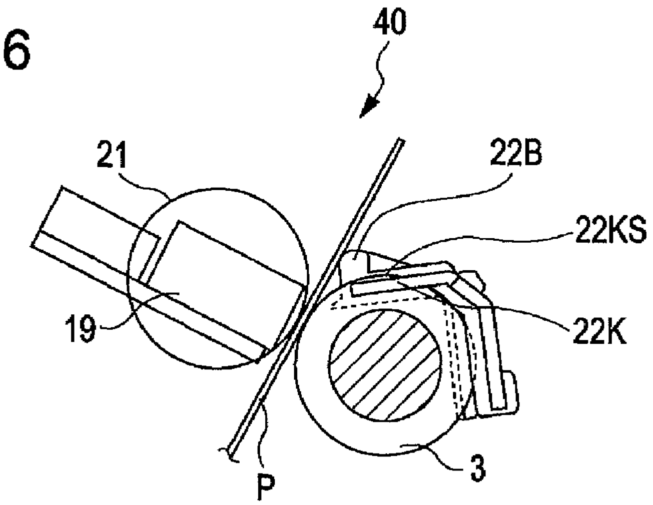

In the state of FIG. 6, the flat plate 22K has been substantially moved (rotated) together with the registration shutter 22. Therefore, the reading surface (reference surface) 22KS read by the sensor 19, of the flat plate 22K, has been moved from the sheet material conveying plane, and is located at a retracted position where the reference surface 22KS is out of contact with the sheet material P.

Therefore, when the conveyance of the sheet material P is continued, the reference surface 22KS of the flat plate 22K is not rubbed by the sheet material P. Therefore, the flat plate 22K is neither damaged nor contaminated.

The intermediate transfer belt 12 is driven by the driving roller 17, and the developed toner images on the photosensitive drums 7 to 10 are transferred onto the intermediate transfer belt 12 by the first transfer rollers 13 to 16 in order.

At this time, the sheet material P has reached the recording material detecting apparatus 40, and the surface condition of the sheet material P is detected by the sensor 19.

When the transferred toner image on the belt is conveyed to the second transfer roller 18, the registration roller 3 is rotated so as to convey the sheet material P to the nip of the second transfer roller 18.

The sensor 19 is corrected in advance using the flat plate 22K. On the basis of the surface condition of the sheet material P detected by the sensor 19, the toner image is transferred onto the sheet material P under an optimum transferring condition, and the unfused toner image is fused to the sheet material P by the fusing unit 4 under an optimum fusing condition. The sheet material P to which the toner image is fused is output onto the paper output tray 6 by the paper output roller pair 5.

Figure 7:
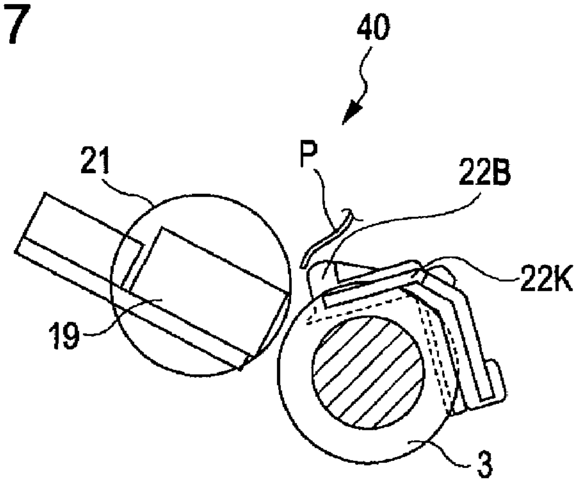
Figure 8A:
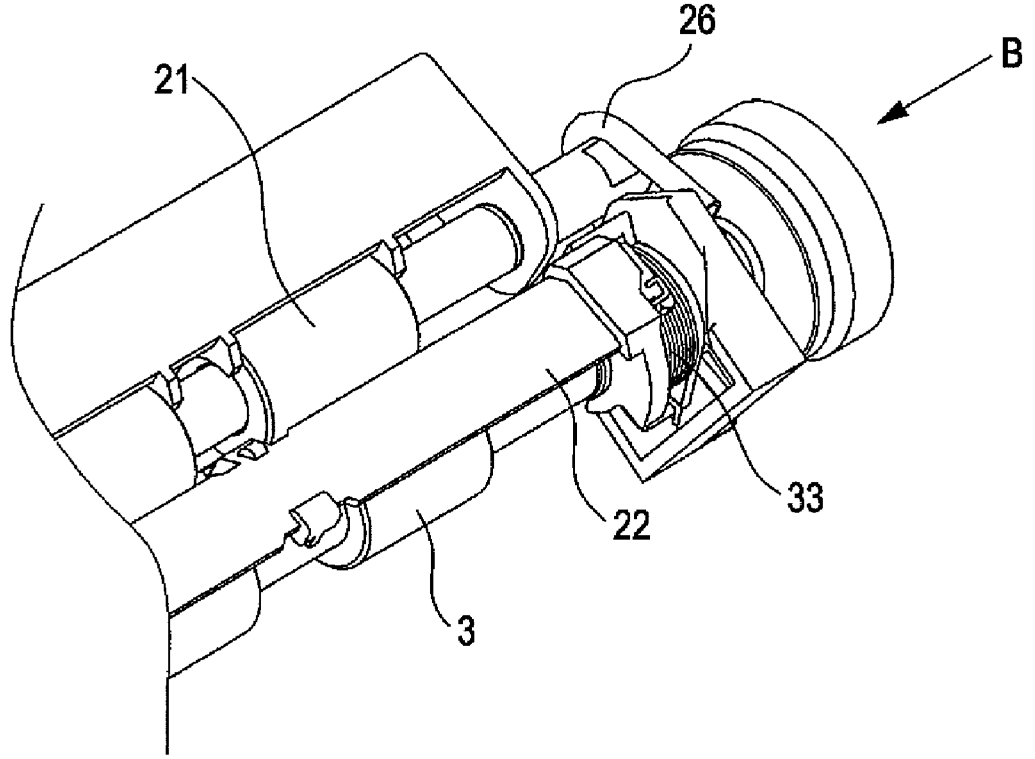
FIGS. 8A and 8B illustrate an end of the recording material detecting apparatus.
Figure 8B:
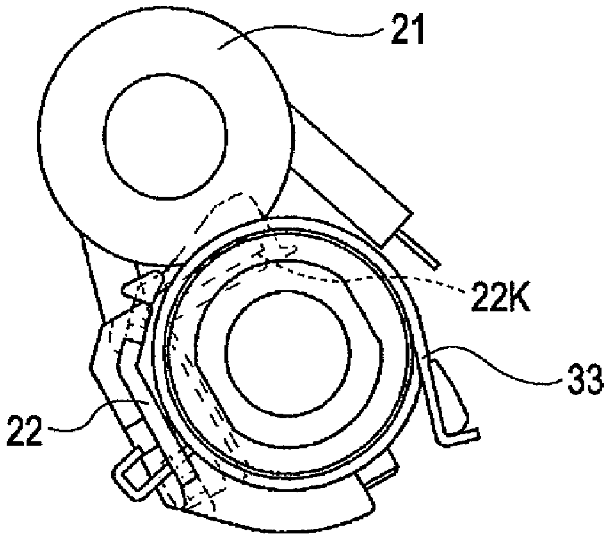

As shown in FIG. 7, when the trailing edge of the sheet material P leaves the abutments 22B of the registration shutter 22, the registration shutter 22 returns to the original position by the spring force of a spring 33 shown in FIGS. 8A and 8B, and consequently the flat plate 22K also returns to the reading position where the sensor 19 can read the flat plate 22K. FIG. 8A is a perspective view of an end of the sheet material detecting apparatus. FIG. 8B shows the sheet material detecting apparatus viewed from the direction of arrow B in FIG. 8A.

As described above, in this embodiment, the supporting member (reference member) supporting the flat plate moves by being pushed by the sheet material P. Therefore, it is not necessary to provide a driving unit, such as a motor, for moving the supporting member. Therefore, the cost of the apparatus body can be dramatically reduced, and the apparatus structure can be dramatically simplified.

In addition, in this embodiment, since the flat plate is provided in the registration shutter, it is not necessary to separately provide a member that supports the flat plate. Also in this regard, the apparatus structure can be simplified.

Second Embodiment

A second embodiment of a recording material detecting apparatus according to the present invention will now be described with reference to FIGS. 9 to 13. The second embodiment differs from the first embodiment in the location of the optical sensor and the structure around the reference portion. The difference will be mainly described. The same reference numerals will be used to designate the same components as those in the first embodiment, so that the description will be omitted.

Figure 9:
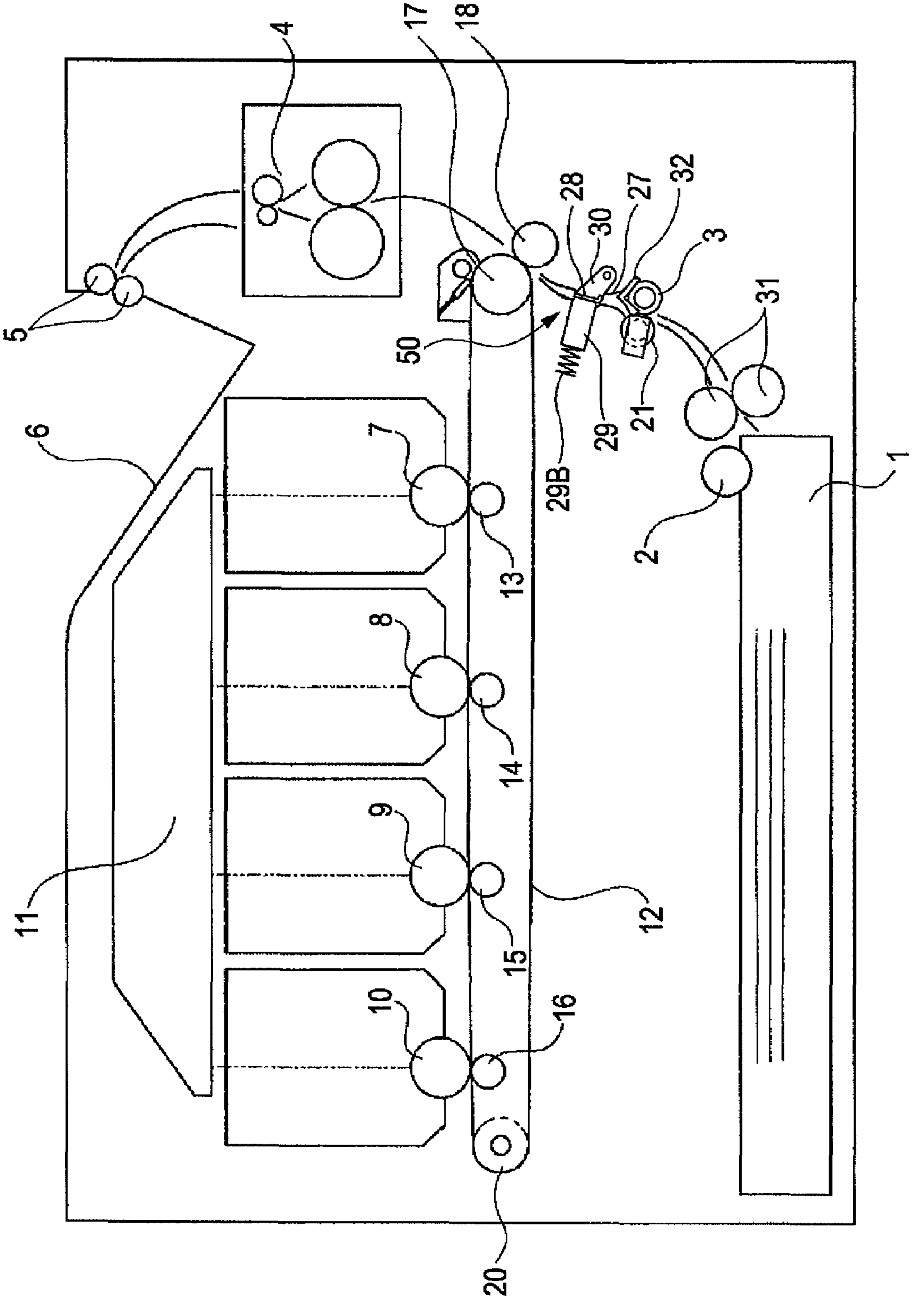
FIG. 9 illustrates an image forming apparatus according to a second embodiment of the present invention.

FIG. 9 illustrates an image forming apparatus equipped with a recording material detecting apparatus 50. As shown, in this embodiment, an optical sensor 29 detecting the surface condition of a sheet material is disposed on the downstream side of the registration roller 3 and the opposing rollers 21, and is lightly pressed against a conveying guide 27 by a spring 29B.

Figure 10:
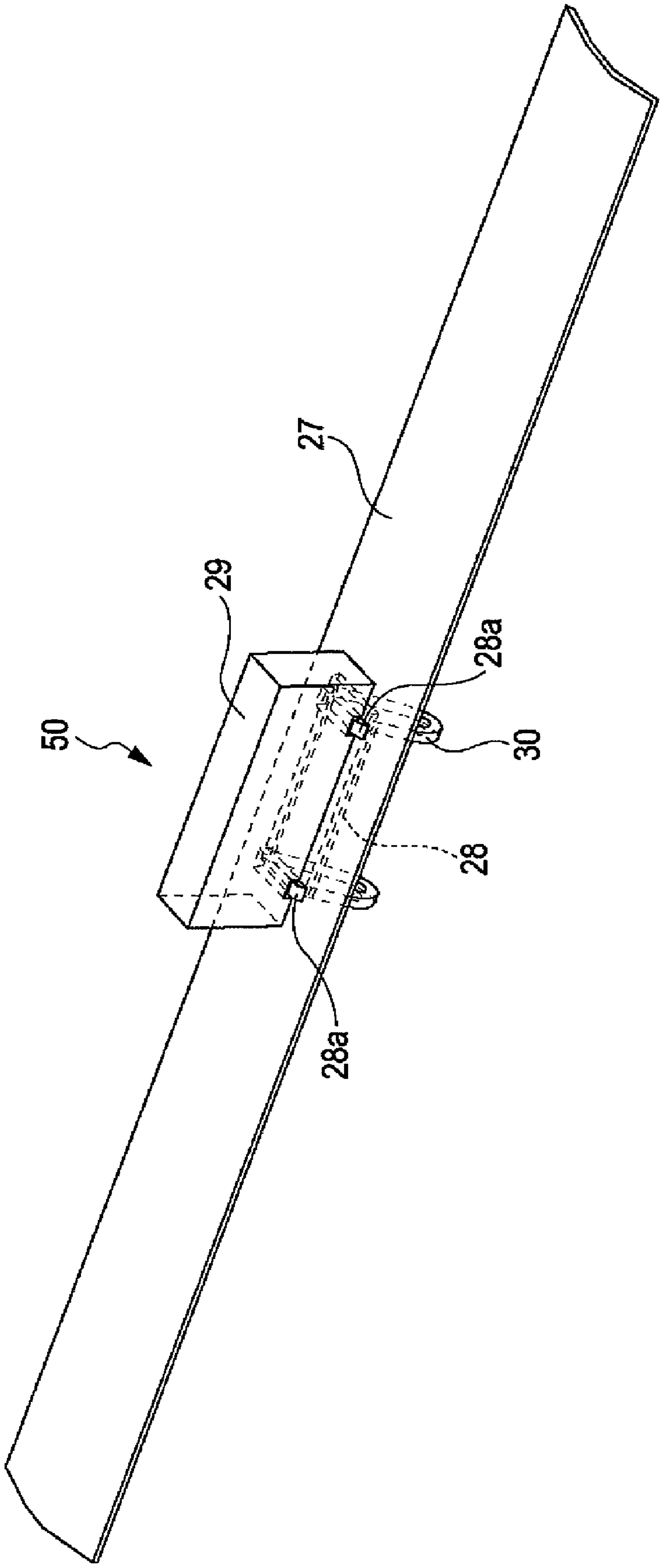
FIG. 10 is a perspective view of an optical sensor detecting the surface condition of a sheet material.

As shown in FIG. 10, the conveying guide 27 has a cutout (opening) in the center in the longitudinal direction (the direction perpendicular to the direction in which the sheet material is conveyed) and opposite the sensor 29. In the cutout is provided a reference portion 28, which is integral with a rockable supporting member 30. That is to say, the supporting member 30 is also a reference member having a reference portion 28. The reference portion 28 has two abutments 28*a*. Outside the abutments 28*a*, the sensor 29 is in contact with the conveying guide 27.

Next, the operation of the recording material detecting apparatus 50 will be described. As in the first embodiment, before a sheet material P is conveyed to the sensor 29, the reference portion 28 is located at a reading position in the conveying path and faces the sensor 29 as shown in FIG. 9. At this time, the sensor 29 reads the reference portion 28. The difference from the initially read value is calculated. On the basis of the difference, the output of the sensor 29 is corrected.

Next, a sheet material P is fed by the paper feed roller 2 from the paper cassette 1. As the sheet material P reaches the nip between the registration roller 3 and the opposing rollers 21, the skew of the sheet material P is corrected by a skew correcting shutter 32. After this, the sheet material P is conveyed to the sensor 29.

Figure 11:
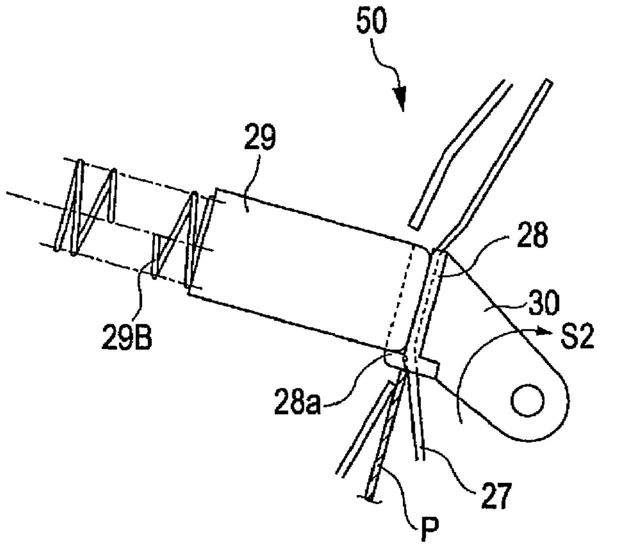
FIG. 11 illustrates an optical sensor detecting the surface condition of a sheet material.
Figure 12:
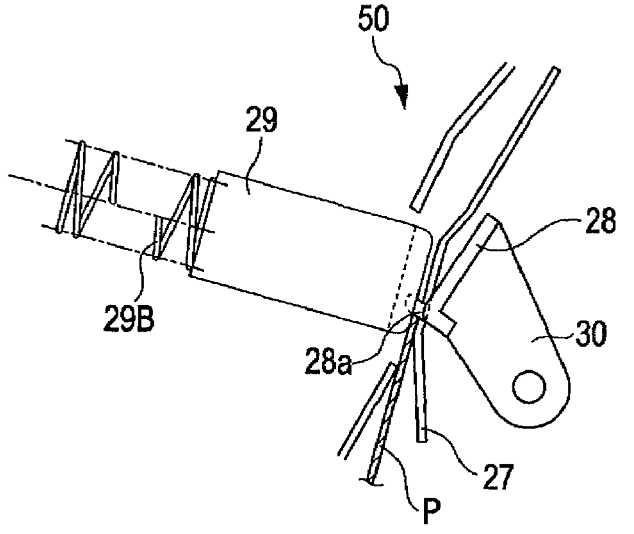
FIGS. 12 and 13 illustrate how a reference portion operates as a sheet material moves.
Figure 13:
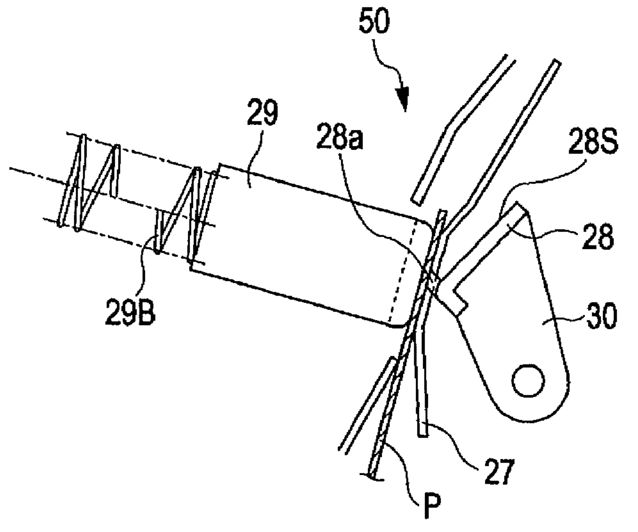

At this time, as shown in FIG. 11, the leading edge of the sheet material P is pressed against the abutments 28*a* of the reference portion 28. While being conveyed, the sheet material P rotates the reference portion 28 in the direction of arrow S2 in FIG. 11. The sheet material P is conveyed to the position of FIG. 13 via the state of FIG. 12, and then stops. In the state of FIG. 13, the reference portion 28 has been rotated. Therefore, the reading surface 28S of the reference portion 28 has been moved from the sheet material conveying plane, and is located at a retracted position where the reading surface 28S is out of contact with the sheet material P.

Therefore, the reference surface 28S of the reference portion 28 is not rubbed by the sheet material P. Therefore, the reference portion 28 is neither damaged nor contaminated.

The intermediate transfer belt 12 is driven by the driving roller 17, and the developed toner images on the photosensitive drums 7 to 10 are transferred onto the intermediate transfer belt 12 by the first transfer rollers 13 to 16 in order.

At this time, the sheet material P has been reached the recording material detecting apparatus 50, and the surface condition of the sheet material P is detected by the sensor 29.

When the transferred toner image on the belt is conveyed to the second transfer roller 18, the registration roller 3 is rotated so as to convey the sheet material P to the nip of the second transfer roller 18.

The sensor 29 is corrected using the reference portion 28 in advance. On the basis of the surface condition of the sheet material P detected by the sensor 29, the toner image is transferred onto the sheet material P under an optimum transferring condition, and the unfused toner image is fused to the sheet material P by the fusing unit 4 under an optimum fusing condition. The sheet material P is output onto the paper output tray 6 by the paper output roller pair 5.

As in the first embodiment, when the trailing edge of the sheet material P leaves the abutments 28*a* of the reference portion 28, the supporting member 30 returns to the position shown in FIG. 11 by the spring force, and the reference portion 28 also returns to the reading position where the sensor 29 can read the reference portion 28.

As described above, also in this embodiment, the supporting member (reference member) supporting the reference portion moves by being pushed by the sheet material P. Therefore, it is not necessary to provide a driving unit, such as a motor, for moving the supporting member. Therefore, the cost of the apparatus body can be dramatically reduced, and the apparatus structure can be dramatically simplified.

In this embodiment, the reference portion is provided separately from the registration shutter correcting the skew of the sheet material. Therefore, the sensor can be disposed more flexibly.

The reference portion can be used not only to correct the sensor that detects the surface condition of a sheet material before transferring but also to correct a sensor that detects the condition of a printed image if the reference portion is disposed in the conveying path on the downstream side of the fusing unit.

As described above, in the present invention, a recording material is used to move a reference portion. Therefore, a driving unit such as a motor is not necessary. Therefore, the cost of the apparatus body can be dramatically reduced, and the apparatus structure can be dramatically simplified.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-158639 filed Jun. 7, 2006, which is hereby incorporated by reference herein in its entirety.

What is claimed is:

1. A detecting apparatus comprising:

a detecting device configured to irradiate a recording material with light and to detect the light from the recording material; and a shutter configured to correct a skew of the recording material, the shutter including a reference portion that is detectable by the detecting device in order to correct an output from the detecting device and an abutment surface against which a leading edge of the recording material abuts and is pushed, wherein the abutment surface is disposed on an upstream side of the reference portion in a conveying direction of the recording material, and wherein in accordance that the shutter is moved by being pushed by the leading edge of the recording material, the reference portion moves from a position where the reference portion is detected by the detecting device.

2. The detecting apparatus according to claim 1, wherein when the detecting device detects the recording material, the shutter moves to a position where the recording material and the reference portion are not in contact with each other.

3. The detecting apparatus according to claim 1, wherein the detecting device detects the surface properties or the thickness of the recording material.

4. The detecting apparatus according to claim 1, wherein the reference portion is located in a recording material conveying path when detected by the detecting device.

5. An image forming apparatus comprising:

an image forming device configured to form an image on a recording material;

a detecting device configured to irradiate the recording material with light and to detect the light from the recording material before the image forming device forms an image; and a shutter configured to correct a skew of the recording material, the shutter including a reference portion that is detectable by the detecting device in order to correct an output from the detecting device and an abutment surface against which a leading edge of the recording material abuts and is pushed, wherein the abutment surface is disposed on an upstream side of the reference portion in a conveying direction of the recording material, and wherein in accordance that the shutter is moved by being pushed by the leading edge of the recording material, the reference portion moves from a position where the reference portion is detected by the detecting device.

6. The image forming apparatus according to claim 5, further comprising a control device configured to control an image forming condition of the image forming device based on the output from the detecting device.

* * * * *